United States Patent
Yekollu

(10) Patent No.: US 12,335,436 B2
(45) Date of Patent: Jun. 17, 2025

(54) METHODS AND SYSTEMS TO BOOKMARK MOMENTS IN CONVERSATION CALLS

(71) Applicant: Clari Inc., Sunnyvale, CA (US)

(72) Inventor: Srikar Yekollu, Dubai (AE)

(73) Assignee: CLARI INC., Sunnyvale, CA (US)

(*) Notice: Subject to any disclaimer, the term of this patent is extended or adjusted under 35 U.S.C. 154(b) by 270 days.

(21) Appl. No.: 18/180,335

(22) Filed: Mar. 8, 2023

(65) Prior Publication Data

US 2024/0305711 A1    Sep. 12, 2024

(51) Int. Cl.
   *H04M 3/42* (2006.01)
   *G10L 15/26* (2006.01)

(52) U.S. Cl.
   CPC ......... *H04M 3/42221* (2013.01); *G10L 15/26* (2013.01); *H04M 2203/303* (2013.01)

(58) Field of Classification Search
   CPC ........ H04M 3/42221; H04M 2203/303; G10L 15/26
   USPC .......................................................... 379/85
   See application file for complete search history.

(56) References Cited

U.S. PATENT DOCUMENTS

| | | | | |
|---|---|---|---|---|
| 2004/0203621 A1* | 10/2004 | Brown | ............. | H04M 3/56 455/414.1 |
| 2006/0056599 A1* | 3/2006 | Cragun | ............. | H04M 3/42221 379/67.1 |
| 2007/0071206 A1* | 3/2007 | Gainsboro | ........ | H04M 3/42221 379/168 |
| 2007/0269025 A1* | 11/2007 | Shieh | ................ | H04M 3/42221 379/67.1 |
| 2009/0306981 A1* | 12/2009 | Cromack | ............. | G06F 16/685 707/E17.103 |
| 2018/0083792 A1* | 3/2018 | Wanderski | ............ | H04L 67/56 |
| 2018/0090135 A1* | 3/2018 | Schlesinger | ........... | G10L 15/22 |
| 2018/0300421 A1* | 10/2018 | Andreica | ............... | G10L 15/26 |
| 2019/0341050 A1* | 11/2019 | Diamant | .............. | G06V 40/172 |
| 2022/0210268 A1* | 6/2022 | Cole | .............. | H04M 3/42221 |
| 2022/0374909 A1* | 11/2022 | Dunn | ..................... | G06F 40/35 |
| 2023/0067687 A1* | 3/2023 | Azarbayejani | ........ | G06Q 30/01 |

* cited by examiner

Primary Examiner — Binh Kien Tieu
(74) Attorney, Agent, or Firm — WOMBLE BOND DICKINSON (US) LLP

(57) ABSTRACT

A server receives an indication of a start of a call to a conversation for a first user at a first terminal device. The server receives a connection request from the first user at a second terminal device. The server receives one or more requests to add one or more bookmarks to the conversation from first user at the second terminal device while the conversation for the first user is ongoing at the first terminal device, wherein the one or more bookmarks correlate to one or more conversation utterances within a timeline of the conversation. The server determines audio transcripts for the one or more voice utterances within the timeline of the conversation. The server tags and stores the bookmarks with the conversation based on the timeline.

20 Claims, 8 Drawing Sheets

METHODS AND SYSTEMS TO BOOKMARK MOMENTS IN CONVERSATION CALLS

TECHNICAL FIELD

Embodiments of the present disclosure relate generally to conversation intelligence. More particularly, embodiments of the disclosure relate to bookmarking of moments in conversation conference calls.

BACKGROUND

Internet conference calls are becoming increasingly common. During sales calls, sales representatives may take notes to remind themselves of events that occurred during a call. The call can be lengthy and there are fairly important moments during the call that the sales representative would like to take note of and get back to customers post call.

BRIEF DESCRIPTION OF THE DRAWINGS

Embodiments of the disclosure are illustrated by way of example and are not limited to the figures of the accompanying drawings, in which like references indicate similar elements.

DETAILED DESCRIPTION

Various embodiments and aspects of the disclosure will be described with reference to the details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" or "in an embodiment" in various places in the specification do not necessarily all refer to the same embodiment.

The disclosure describes systems and methods to add bookmarks to a conversation call, such as a voice over internet protocol (VOIP) call or a video conference call over the internet. The bookmarks can function as reminders/marker points for important events in the conversation. According to an embodiment, a backend server receives an indication of a start of a conversation for a first user at a first terminal device. The server receives a connection request from the first user at a second terminal device. The server receives one or more requests to add one or more bookmarks to the conversation from first user at the second terminal device while the conversation for the first user is ongoing at the first terminal device, wherein the one or more bookmarks correlate to one or more conversation utterances within a timeline of the conversation. The server determines audio transcripts for the one or more voice utterances within the timeline of the conversation. The server tags and stores the bookmarks with the conversation based on the timeline.

Other embodiments, functions and advantages will be apparent from the accompanying drawings and from the detailed description that follows.

Figure 1:
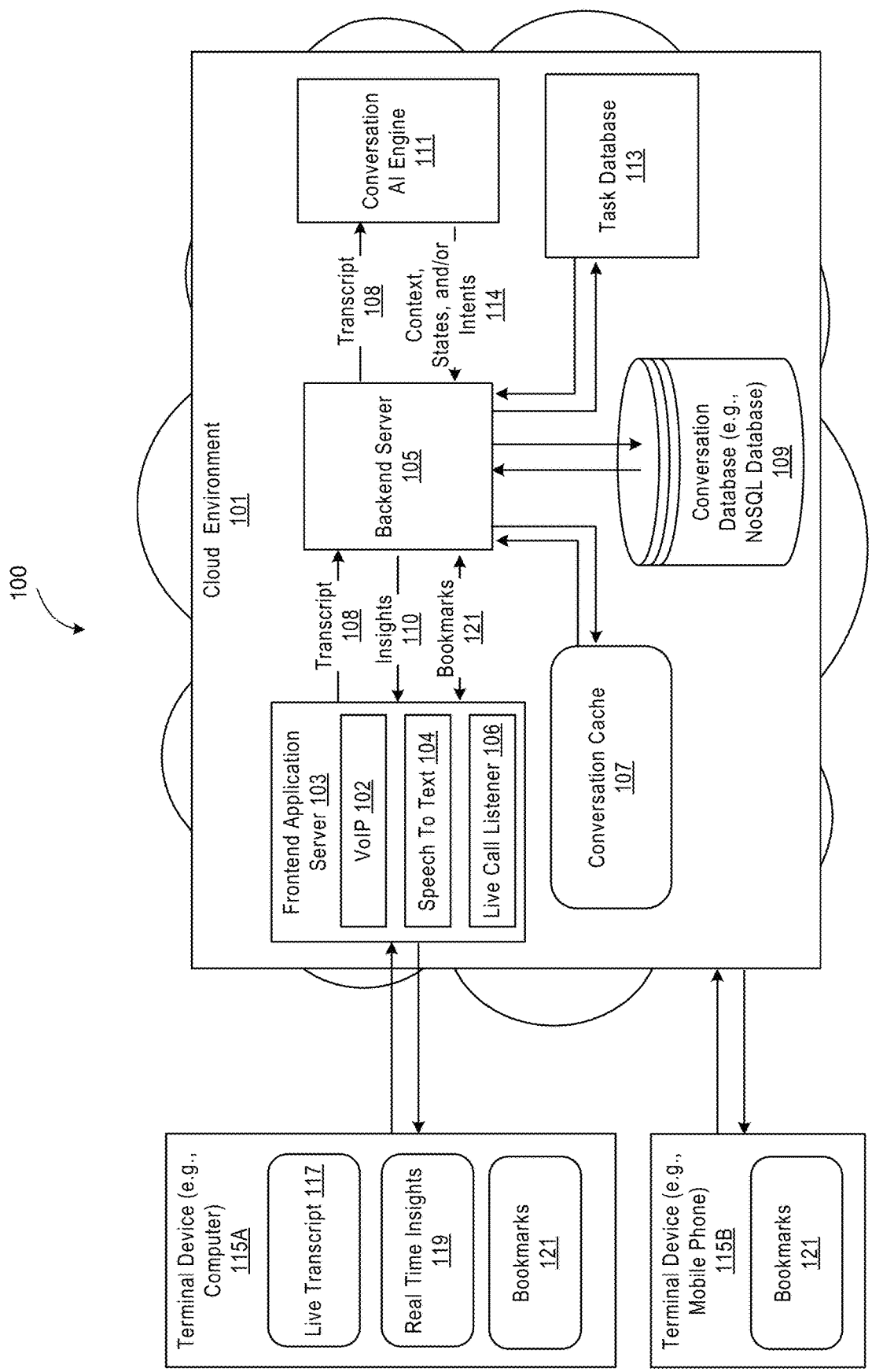
FIG. 1 is a block diagram illustrating a system for conversation calls according to an embodiment.

FIG. 1 is a block diagram illustrating a system 100 for conversation calls according to an embodiment. As shown in FIG. 1, the system 100 includes one or more terminal devices, such as mobile phones, laptop computers, etc., and servers and databases residing in the cloud and/or on-premises environment. This embodiment illustrates two terminal devices 115A-115B from a single user login, and servers and databases residing in a cloud environment 101 for the purpose of illustration.

The cloud environment 101 can include a frontend application server 103, a backend server 105, a conversation artificial intelligence (AI) engine 111, a conversation state cache 107, a conversation database 109, and a task database 113. In some embodiments, frontend application server 103 is implemented by terminal devices 115A-115B.

The frontend application server 103 can include a number of services, such as a VoIP service 102, a speech to text service 104, and a live call listener service 106. The VOIP service 102 converts voice utterances of a user of the terminal devices 115A-B into a digital signal that travels across the internet, allowing the user to make a call directly from the terminal device 115A. The speech to text service 102 can be a speech recognition service that converts the voice utterances/or speech of the user of the terminal device 115A into live transcripts 117. The live call listener service 106 allows a third party (such as a manager) to listen to a live call managed by the frontend application server 103 without the knowledge of either party on the call. In some embodiments, the text to speed conversion is performed by a local speech to text service provided at terminal device 105A to generate live transcripts 117.

At any point during the call, the user can tag the conversation with one or more bookmarks 121 from terminal device 115A and/or terminal device 115B. For example, the user can press an add bookmark button on a user interface (UI) of a companion application at terminal 115B. The bookmark is tagged to the conversation at a time in a timeline of the call when the add bookmark button is pressed. When the call is transcribed, the bookmark can specify the speaking participant(s), the segment of the call conversation, and the time when the bookmark is entered. In some embodiments, the bookmark can be associated to a bookmark category via a dropdown menu in the UI. Example bookmark categories can include contacts, customers, dates, deal amount, etc. In some embodiments, the bookmark categories can correspond to any of insights, context, states, and/or intents as further described below.

The backend server 105 can receive a transcript 108 from the frontend application server 103, and provide the transcript 108 as input to the conversation AI engine 111, and receive intents 114 generated by the conversation AI engine 111. In some embodiments, the backend server 105 can receive bookmarks 121 from terminal devices 115A-B via frontend application server 103. Backend server 105 can store bookmarks 121 in conversation database 109. In some embodiments, server 105 stores bookmarks 121 in an activity database 201 as further shown in FIG. 2.

In an embodiment, the conversation AI engine 111 can be a natural language processing (NLP) engine that combines computational linguistics (i.e., rule-based modeling of human language) with statistical, machine learning, and deep learning models to understand the meaning of human language, including the intent of the speaker. The conversation AI engine 111 can include a number of components for extracting linguistic features of the transcript 108, such as the basic grammar rules, word organizations, and relations between words. The number of components can include a machine learning model for inferring the meaning of each sentence in the transcript 108, and an intent classifier for identifying one or more intents of each sentence in the transcripts 108. The intent classifier can be a rule-based pattern matching algorithm, or a deep learning model (e.g., an artificial neural network).

In an embodiment, an intent can be a text expression indicating the intention of the speaker when uttering a sentence. For example, if the transcript 108 is "I would like to book a flight from San Francisco to New York City," the conversation AI engine 114 would analyze the sentence to infer its meaning, and then classify the sequence of words under the label "book flight". In this case, the text "book flight" is an intent of the speaker.

In an embodiment, the conversation AI engine 111 can generate multiple intents for a transcript. In this case, the conversation AI engine 111 can rank the multiple intents based on a number of factors, such as how frequently each intent appears historically. A more frequently appearing intent is ranked higher than a less frequently appearing intent if all the other ranking factors are the same. The highest ranked intent can be selected as the intent of the sentence by the conversation AI engine 111.

The conversation state cache 107 can store each conversation along with a context of the conversation and an identifier that uniquely identifies the conversation. The context of the conversation can be a data object, for example, a JavaScript Object Notation (JSON) object, and can include one or more of the following properties: participants of the conversation, a period of time that the conversation relates to, whether the participants include an external party, contact information of the external party, activities between the participants, whether a competitor is mentioned, or deal information among the participants. The properties in each context can be deleted or added, and the value of each property can be also updated. Each change in a value of a property or each property addition or deletion can change the state of the context. The conversation state cache 107 also keeps track of the state changes in the context of each conversation.

In an embodiment, a state change can be caused by a conversation participant raising a new topic, mentioning a new competitor in a new voice utterance during a conversation. Multiple voice utterances can include the same intent. Thus, one state change can correspond to multiple transcripts, each of which can correspond to one or more intents.

The conversation database 109 can be a NoSQL database that stores entries that each map a state of a context of a conversation and a corresponding intent to an insight. Thus, given a state of a context and an intent associated with the context state, insights 110 corresponding to the state and the intent can be retrieved from the conversation database 109.

In an embodiment, the insights in the conversation database 109 can be derived from historical data, including activity data and account data as further described below.

The task database 113 can be a customer relationship management (CRM) system, and can store information about deals. Examples of the deal information include potential value of the deal, a stage of the deal (e.g., "commit" or "completed"), contact persons, and their contact information. The contact persons of a deal can include one or more source contact persons (e.g., sales representatives) and one or more target contact persons (e.g., customer contact persons).

When receiving a transcript from the frontend application server 103, the backend server 105 can determine a context based on the participants of the conversation, and information associated with the participants that is retrieved from the task database 113.

By default, each context has a default state. The default state can be changed by an addition or a deletion of a property, or by a change in a value of an existing property. The backend server 105 can formulate one or more queries based on the intent generated by the conversation engine 111, a context of a conversation, and a state of the context, and can intelligently determine which database to query.

For example, in one embodiment, if the intent concerns a simple retrieval of information, such as contact information of target contacts, the backend server 105 can query the task database 113; otherwise, the backend server 105 can query the conversation database 109. In another embodiment, the backend server 105 can query both the task database 113 and the conversation database 109.

Figure 2:
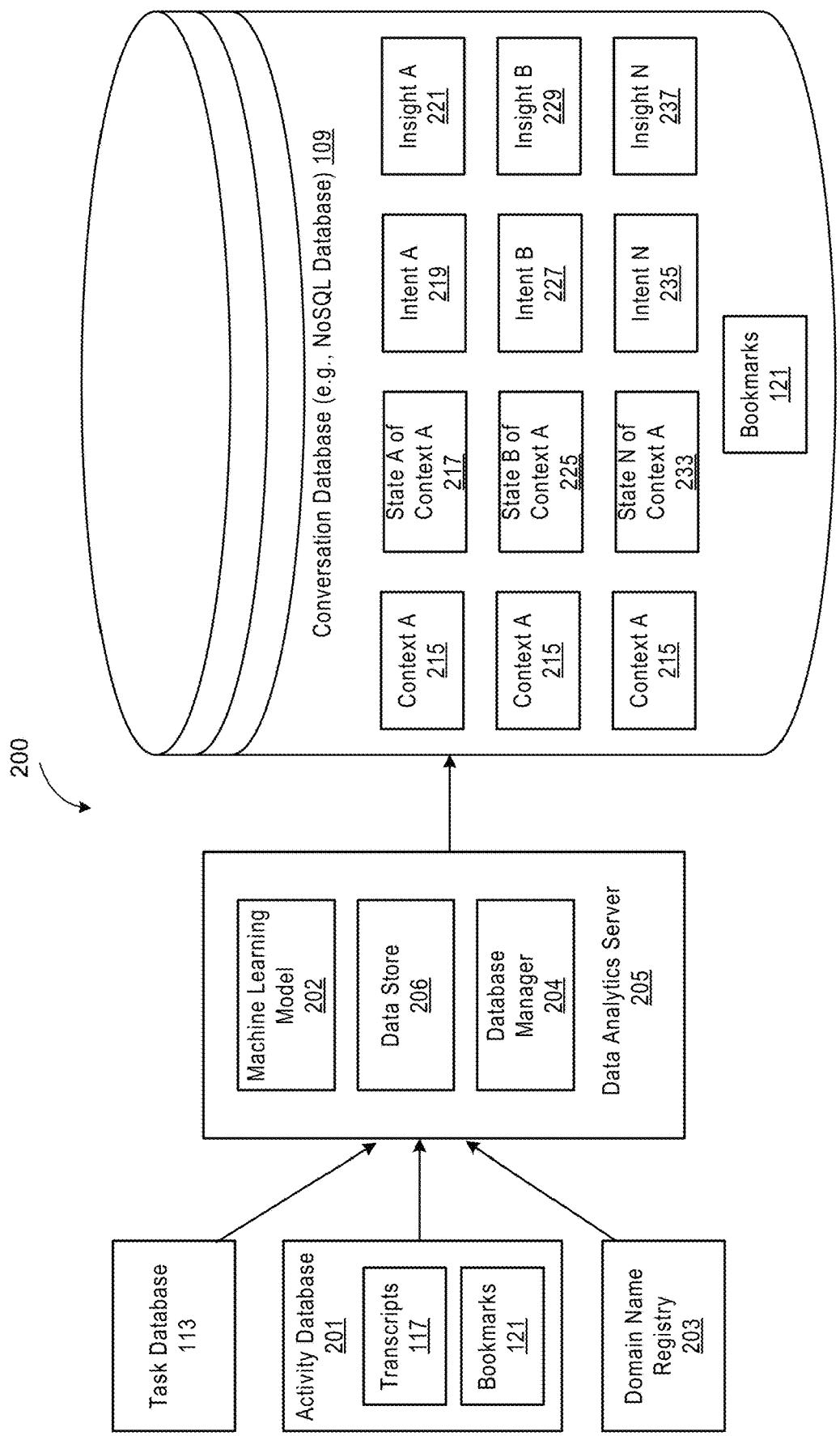
FIG. 2 illustrates a system for populating the conversation database according to an embodiment.

FIG. 2 illustrates a system 200 for populating the conversation database 109 according to an embodiment of the disclosure. As shown in FIG. 2, the system 200 can include a data analytics server 205 for retrieving data from a number of data sources, such as the task database 113, an activity database 201, and a domain name registry 203. The system 200 can use a machine learning model 202 to identify insights from the retrieved data, and populate the conversation database 109 with the identified insights.

The activity database 201 can include activity data such as video conference meetings and/or transcripts of VOIP phone calls (i.e., conversations), and persons who conducted the activity (i.e., participants of the activity). A database manager 204 running on the data analytics server 205 can provide one or more services to initiate or schedule processing threads to synchronize data between the activity database 201 and the task database system 113, such that each task/deal in the task database system 113 can have updated activity information for that task. The synchronization can be performed automatically and periodically using multiple processing threads. Through a first processing thread executed by a processor, the database manager 204 can access the activity database 201 via an application programming interface (API) over a network to retrieve a list of event objects that are associated with a number of activities in the activity database 201.

Through a second processing thread, the database manager 204 can determine one or more participant identifiers (IDs) from each of the event objects. The participant IDs identify one or more participants in an event or activity associated with the event object. The database manager 204 can extract a domain ID from each participant ID. Alternatively, the database manager 204 can obtain the domain ID for each participant by searching a data structure or database, or through a third party such as a domain registry server 203. The database manager 204 can identify one or more entity objects (e.g., account/corporation entities) based on the domain ID, where the entity objects are stored in the task database 113.

In some embodiments, for each of the entity objects, the database manager 204 can determine whether one or more task objects are associated with the entity object. Each task object (e.g., sales project or the like) is associated with a task to be completed within a predetermined period of time. For each of the task objects, the database manager 204 can determine whether a participant ID matches a user (participant) ID of any user of a user group associated with the task object. If so, at least one attribute (e.g., project progress) of the task object is modified based on the participant ID.

In an embodiment, a data store 206 can be provided in the data analytics server 205 for use to store or cache data for a variety of tasks or activities, which may be periodically updated from the corresponding data source(s) or data provider(s), in this example, database systems 113 and 201.

The machine learning model 202 can use a set of predetermined rules to identify insights from the task data and the activity data. As discussed above, each task can be in one of a number of stages. The machine learning model 202 can examine activity data corresponding to each stage of the task (e.g., stage of project), and determines which type of activity might have contributed to the progression of the task from one stage to the next stage, and identify a particular phone call/video meeting as insights.

For example, the machine learning model 202 can examine activity data of two similar tasks. If task A moves from one stage to a next stage while task B does not, and the only difference between the two tasks is that the sales representative for task A addresses the customer with "You" frequently when requesting an in-person meeting while the sales representative for task B rarely address the customer directly, then the machine learning model can identify "directly addressing customers with 'You'" as an insight.

The conversation database 109 can be populated with insights identified from the task data and the activity data, and can be populated with bookmarks that correspond to the activity data and/or insights.

As shown in FIG. 2, the conversation database 109 includes bookmark 121, insights 221, 229, and 237 for context A 215, and their respectively context states 217, 225, and 244, and intents 219, 227 and 235. The entries are provided for the purpose of illustration. In some embodiments, the conversation database 109 can include more than three insights as identified by the machine learning model 202 from the data sources 113, 201, and 203.

Figure 3:
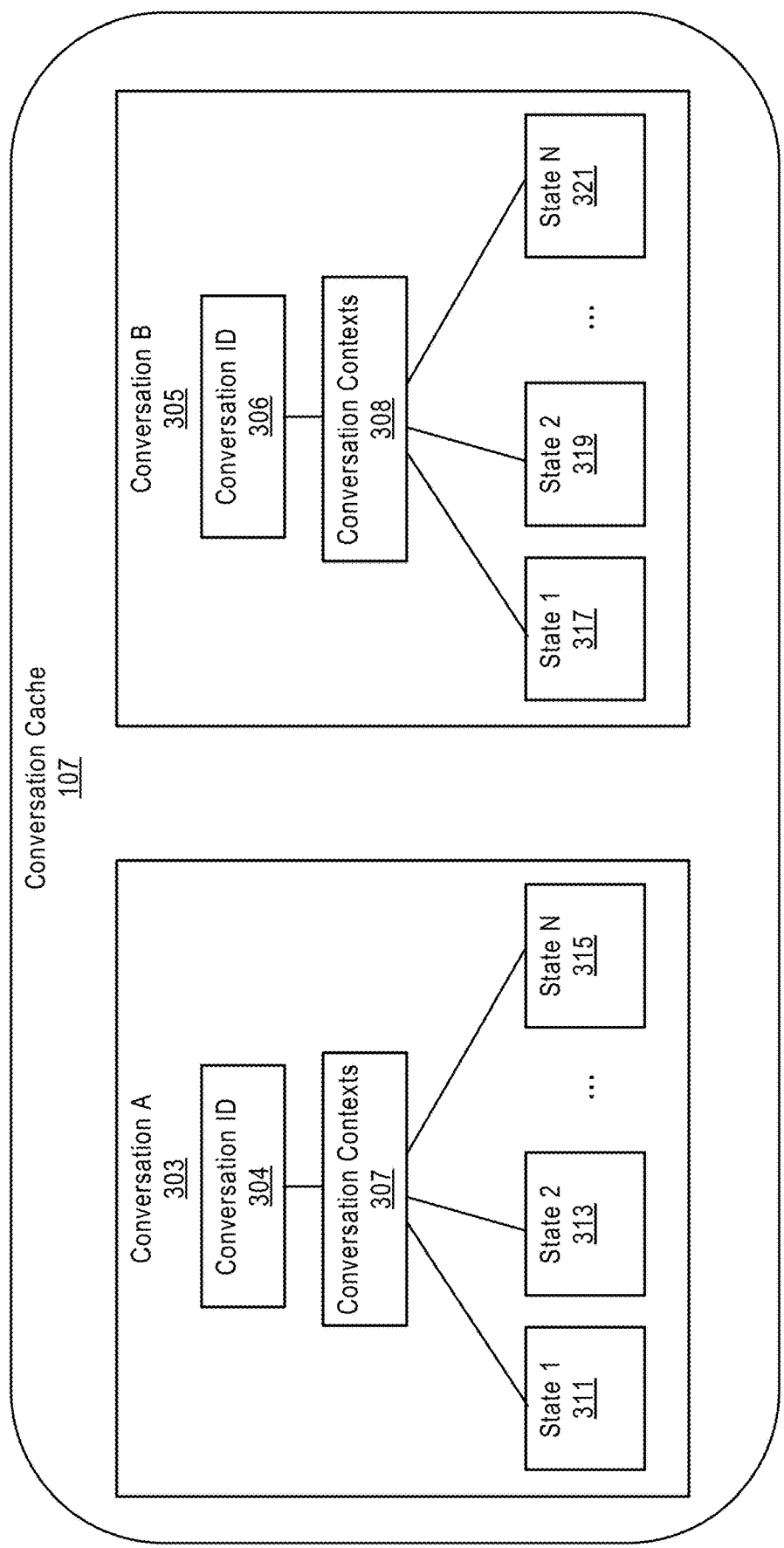
FIG. 3 illustrates an example of the conversation state cache according to an embodiment.

FIG. 3 illustrates an example of the conversation state cache 107 according to an embodiment of the disclosure. The conversation state cache 107 can store conversation contexts and their states. During a conversation, the backend server 105 can store each context identified and each state of the context to the conversation state cache 107, and also retrieve the context and its associated states during the conversation for use in identifying insights. In some embodiments, the context and its associated states can be used as various bookmark categories for a user to bookmark a moment in a timeline of a call. Some example contexts for sales can include overview, deals, activities, contact (customer), name (customer), deal health, deal status, emails, meeting, campaigns, opportunities, activity, quota, revenue, etc. An initial context for a conversation can be "overview" and the context can change as the conversation progresses.

In an embodiment, the conversation state cache 107 can store a name-value pair for each conversation. The name can be a unique ID for a particular conversation, and the value can be the context of the conversation.

As shown in FIG. 3, a context 307 for conversation A 303 and another context for conversation B 305 are stored in the conversation state cache 107, and each context is associated with a unique identifier 304 and 306. Further, states 311, 313, and 315 for the context 307 and states 317, 319, and 321 for the context 308 are stored in the conversation state cache 107.

The state information for each conversation constitutes a state machine that keeps track of all states of the context of a conversation, e.g., what is being asked previously in the conversation. The state machine enables the backend server 105 to identify an intent of the person more accurately.

For example, if a current state is associated with an utterance of "contact information", this utterance alone is insufficient for the backend server 105 to determine the intent of the speaker. However, if one or more earlier states in the state machine is associated with "a customer", then the combination of the current state and the one or more earlier states would be sufficient to identify the intent of the participant in the conversation as "requesting customer contact information." Some examples of states include noun words that are uttered in a conversation, such as "contact information", "customer", "email address", "phone number", "name", etc.

Intent can be further refined based on historical states of the context reflecting what has been previously discussed in this conversation. The backend server 105 can construct one or more queries from the refined intent and the context state, and run the one or more queries against the conversation database 109 and/or the task database 113 to retrieve one or more insights for the conversation to be displayed on a terminal device.

In an embodiment, it may happen that none of the queries may retrieve anything from either database. When that happens, no context/states/intent/insight are displayed on a terminal device. Insights may similarly be retrieved from the task database 113 and/or the conversation database 109. Examples of some insights include information indicating the total amount of annual recurring revenue (ARR) from an entity, a deal A has been closed last week by employee A of the entity, deal B has been moved to the commit stage, three emails sent by employee A to customers last week and three emails received by employee A from the customers, etc.

Thus, an intent generated by the conversation AI engine 111 can be refined based on one or more states in the state machine stored in the conversation states cache 107.

In one embodiment, the bookmark in a call conversation can be automatically categorized as the context, state, intent, and/or insight (ranked by frequency of occurrence) in the call conversation. Later retrieval of the conversation can reveal the bookmark corresponds to the intent/insight as further described in FIGS. 4-6B.

Figure 4:
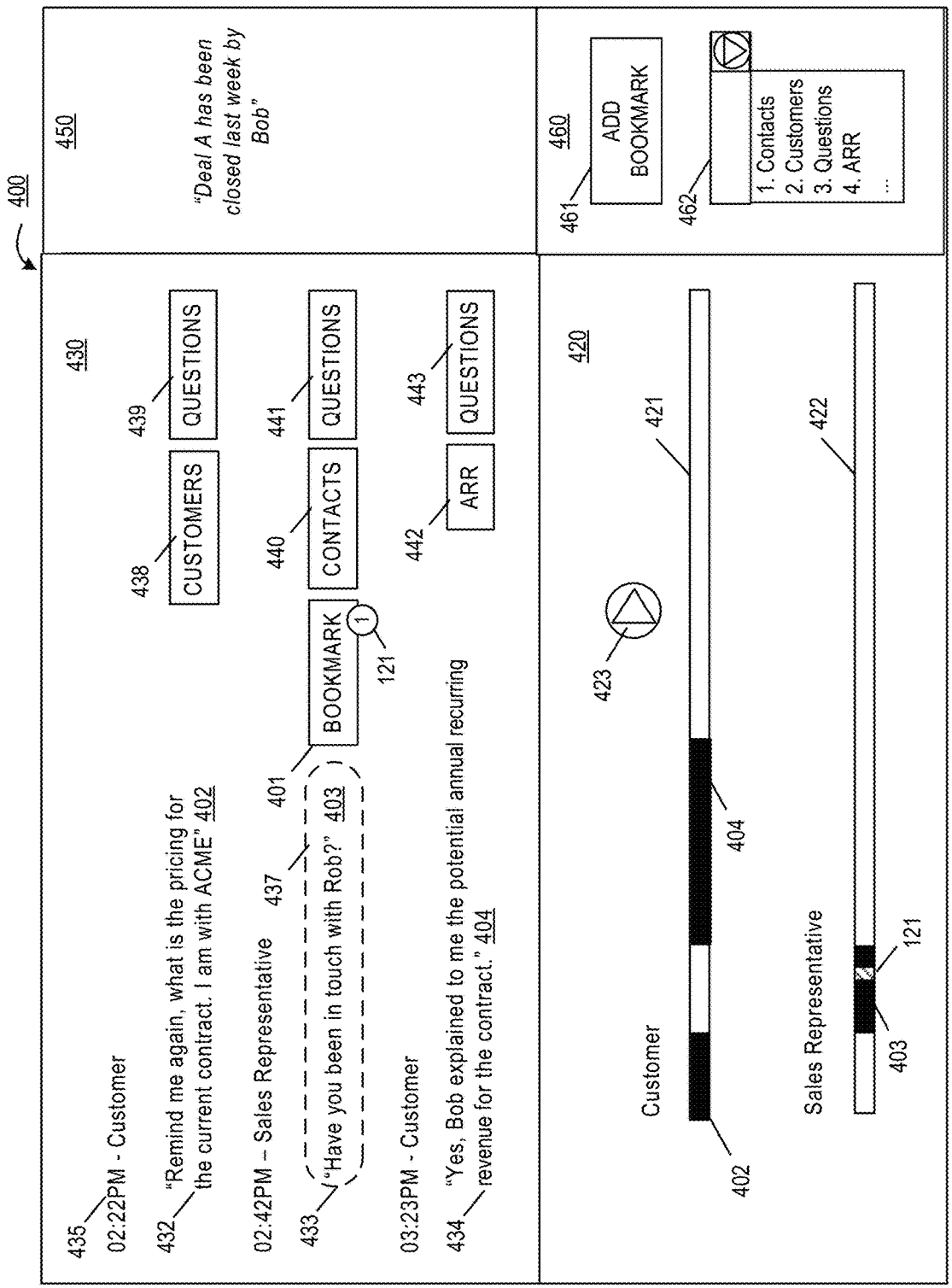
FIG. 4 is a block diagram illustrating an example user interface (UI) to view audio transcripts and bookmarks according to an embodiment.

FIG. 4 is a block diagram illustrating an example user interface 400 to view the transcripts and bookmark according to an embodiment. User interface 400 focuses on a particular use case involving two participants, e.g., prospect/ customer and sales representative, among many other possible use cases, e.g., more than two participants between internal users within a company or internal/external users of the company. User interface 400 can be implemented as a standalone application or as a web-based application. In one embodiment, user interface 400 can be partitioned into four panels 420, 430, 450, and 460. Panel 420 can include one or more timelines 421-422 for a conversation call. Here, timeline 421 refers to the voice utterance by a customer and timeline 422 refers to the voice utterance by a sales representative. Timeline 421-422 can highlight the segments 402-404 where the participants speak. The segments 402-403 can replay when a user selects one of segments 402-403 and press play button 423. In some embodiments, one or more bookmarks 121, and an associated category denoted by (1), are added by the sales representative during the conversation call. Here, bookmark(s) 121 is shown in timeline 421-422. In this case, bookmark(s) 121 is entered by the sales representative when the sales representative spoke, e.g., within segment 403.

Panel 430 can include live transcripts of the conversation. For example, transcripts 432-434 can list, in a linear manner according to the conversation timeline, transcribed texts corresponding to segments 402-404. Each of the transcripts 432-434 can have a header 435 specifying a begin time of the segment and the participant that spoke during the segment of the conversation. The transcripts 432-434 can include bookmark label(s) 121 at a right side. The transcripts 432-434 can further include contexts, context states, and/or intent labels 438-443 at the right side of the transcripts. When a transcript is selected via selection 437, panel 450 can display insights corresponding to the transcript in selection 437. For example, the insight "Deal A has been closed last week by Bob" displays in panel 450 when user selects/highlights transcript 433 "Have you been in touch with Bob?".

Panel 460 includes an add bookmark button 461 for a user to enter a bookmark during a live conversation and a dropdown menu 462 that lists the available categories (such as context, states, intent, and/or insights) to categorize the bookmark.

In summary, as previously described in FIG. 1, transcripts 432-434 can be provided to the conversation AI engine 111 and conversation AI engine 111 can determine and can send contexts, states, and/or intents associated to the transcripts to the backend server. The contexts, states, and/or intents can be used by the backend server to generate insights. The contexts, states, intents, and/or insights are then returned to frontend application, where these information are displayed for terminal devices 115A-115B. Further, bookmarks can be added to the conversation to mark times in the conversation that are deemed important by the participant and the bookmarks can be categorized to any of contexts, states, intents, and/or insights.

Figure 5:
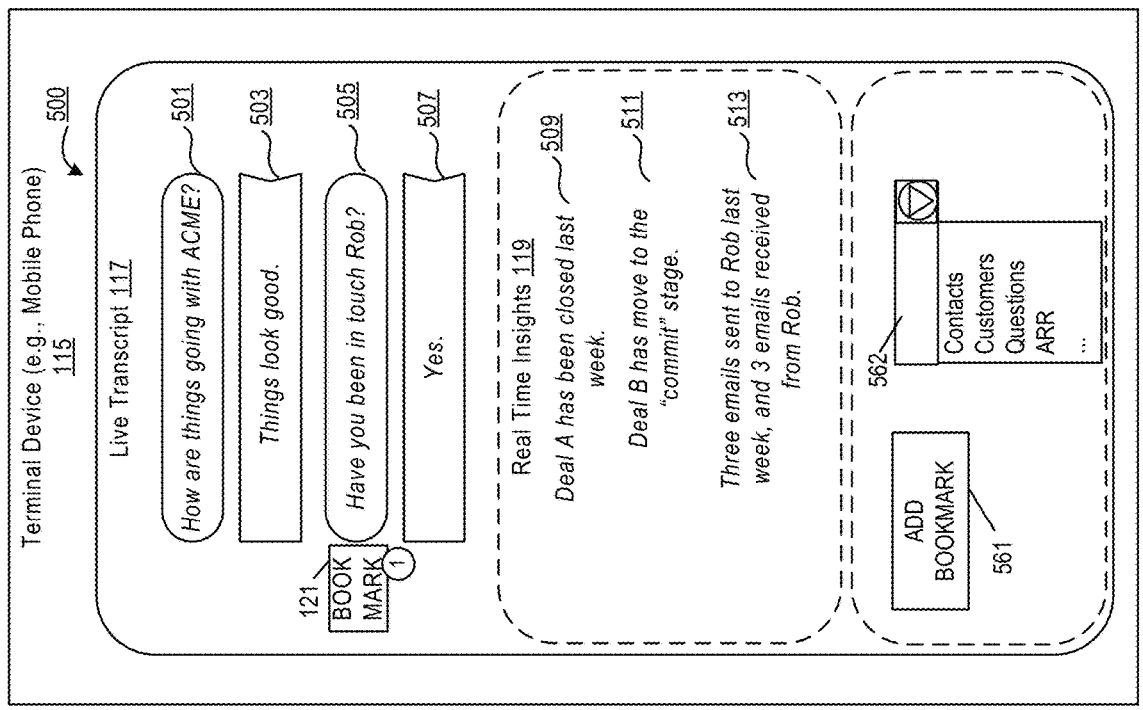
FIG. 5 illustrates a user interface of a companion application to add bookmark(s) to a conversation according to an embodiment.

FIG. 5 illustrates a user interface of a companion application 500 to add bookmark(s) to a conversation according to an embodiment. When a user is on a video conference (conversation) call (such as a Teams/Zoom/WebEx/Slack meeting or the like) on a first terminal device, an entire display screen of the first terminal device is typically covered by the video conference application. Here, a companion application 500 at a second terminal device provides additional means for a user (e.g., the sales representative in the call) to add a bookmark to a conversation and/or view the current bookmarks/insights for the conversation.

For example, a user (e.g., sales representative participant) can request to login to companion application 500 with his/her user account on a mobile terminal device. Once logged in, companion app 500 requests from a backend server for any ongoing live conversation for the user and indications how long the live conversation has started. In another embodiment, companion app 500 receives indications of a start of a conversation. The user can then view the live conversation and their audio transcripts on companion app 500 as the conversation progresses. In one embodiment, the user can request a bookmark to be added to the conversation from the second terminal device (via add bookmark button 561 at terminal 115B of FIG. 1), where the conversation is ongoing at the first terminal device (such as terminal 115A of FIG. 1).

Referring to FIG. 5, companion application 500 in this example illustrates sentences 501-507 in live transcript 117. Sentences 501 and 505 are translated from voice utterances of one party/participant (e.g., a sales manager) of a conversation. Sentences 503 and 507 are translated from voice utterances of another participant (e.g., a sales representative). As shown, bookmark label 121 and its associated category, denoted by a numeric value (1), is shown tagged to sentence 505. For example, bookmark label 121 can correspond to a bookmark added to the conversation by the sales representative during the call when sentence 505 is uttered by a participant. Note that the bookmark category, represented as a numeric value, can be mapped to the bookmark by a mapping table (as part of activity database) by backend server.

In the panel for real-time insights 119, messages 509 and 511 can be related to sentence 501, and message 513 can be related to sentence 505. The insights can be displayed in real-time while the conversation is on-going.

In the panel for bookmark functionalities, a user can click add bookmark button 561 to request a bookmark to be added to a particular moment of a live conversation. The add bookmark request can include information such as a user (participant) identifier, conversation identifier, a bookmark category, domain identifier, and/or an explicit time at the moment when the add bookmark button is pressed. Further, dropdown menu 562 allows the user to select a bookmark category for the bookmark.

Bookmarks (or bookmark moments) can be configured, by the owner of the bookmark, whether they are visible to particular users, or groups of users (via configuration information as part of activity database). Examples for user groups can include everyone, sales team of the owner/user, manager of the owner/user, human resources department, IT department of the company, etc. When a conversation is reviewed at a later time, only the subset of users who are given permission to view the bookmarks can access the bookmark to view the bookmark label in an UI. That is, users or groups of users without permission to view the bookmarks have no access to the bookmarks.

Figure 6A:
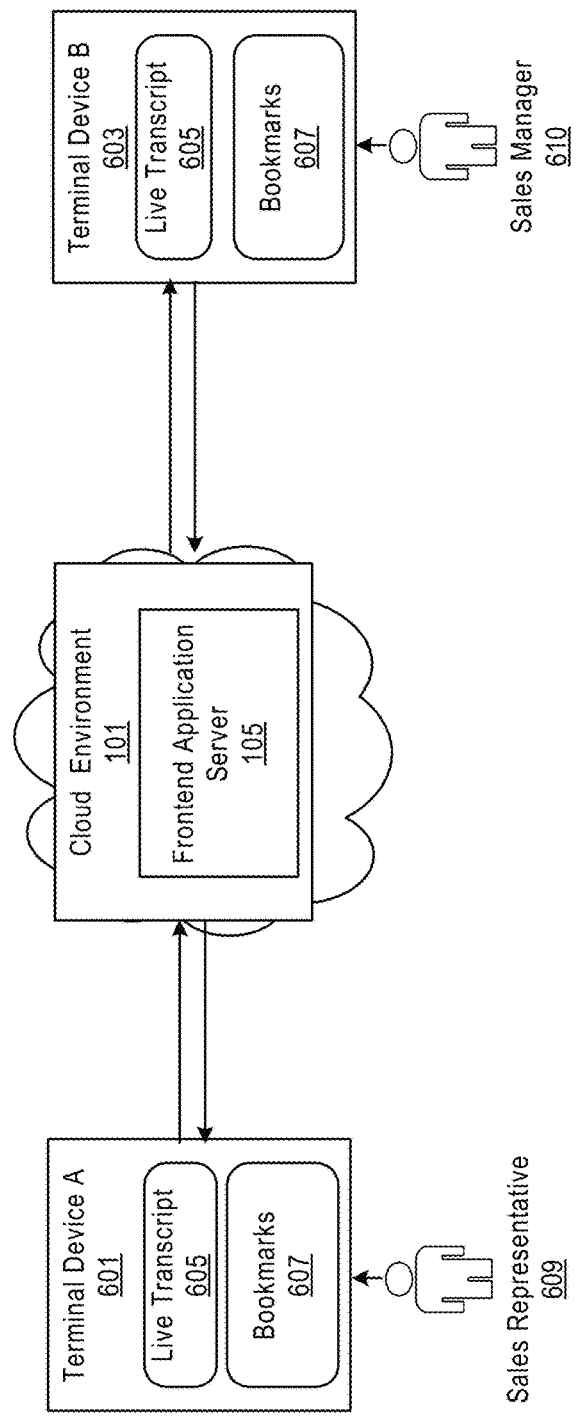
FIGS. 6A and 6B illustrate example conversations for a sales representative according to some embodiments.
Figure 6B:
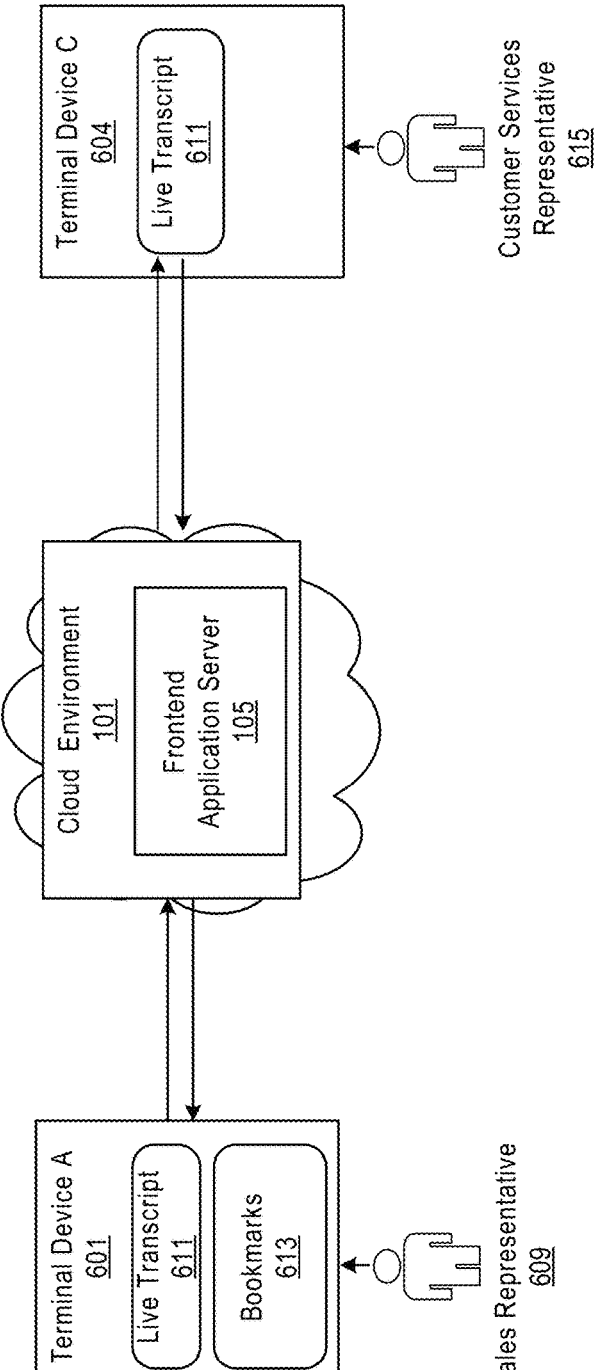

FIGS. 6A and 6B illustrate conversations for a sales representative according to some embodiments. The conversations can be between sales representative 609 and third party customers. In FIG. 6A sales representative 609 and his sales manager 610 are reviewing a conversation during live call or at a later playback. When bookmarks 607 are configured to be accessible by sales manager 610, bookmarks 607 are displayed to terminal devices 601 and 603 for sales representative 609 and sales manager 610, along with a live transcript 605 of the conversation. Here, sales representative 609 is the owner of bookmarks 607 and sales manager 610 is configured with permission to view bookmarks 607. In some embodiments, the permission to view bookmarks 607 can default to the sales representative and his manager.

FIG. 6B relates to a different conversation between the sales representative 609 and a third party. Here, bookmarks 613 may be displayed on a terminal device of the sales representative 609, but not on a terminal device 604 of the customer services representative 615. Here, sales representative 609 is the owner of bookmarks 607 and customer services representative 615 is not configured with permission to view bookmarks 607. Further, if other employees of the same company listens in to the call, those employees' terminal devices may access live transcript 604 but not bookmarks 607 so that only live transcript 604 is displayed if the other employees are not given permission to view bookmarks 607. Note that bookmarks 607, 613 can correspond to bookmarks 121 of FIG. 1.

Figure 7:
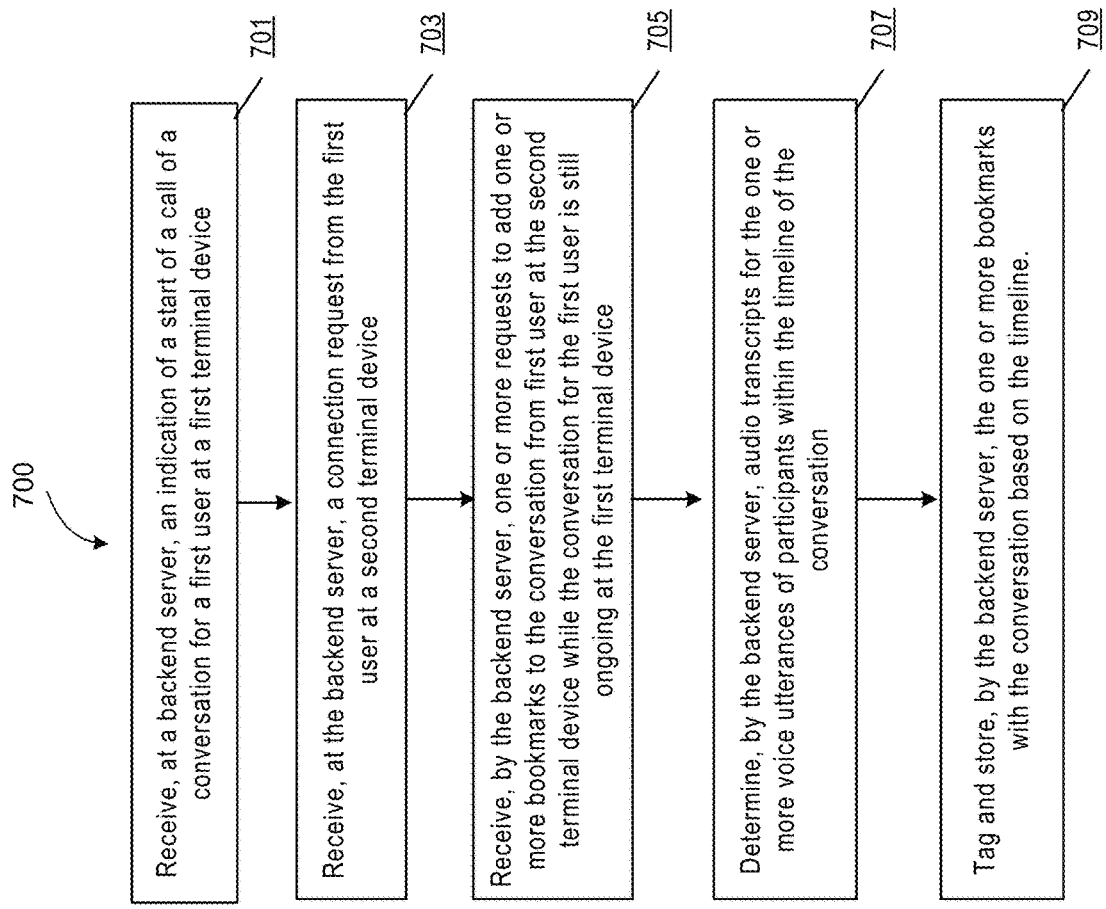
FIG. 7 illustrates a process of adding a bookmark to a conversation call according to an embodiment.

FIG. 7 illustrates a process 700 of adding a bookmark to a conversation call according to an embodiment. The process 700 can be performed by processing logic that includes software, hardware, or a combination thereof. For example, processing logic may be performed by frontend application server 103, backend server 105, or terminal devices 115A-115B as described in FIG. 1.

The process 700 adds bookmarks to a VOIP call (such as a phone call over the Internet) or a video conference meeting (such as a Teams/Zoom/WebEx/Slack video conference meeting or the like). The bookmarks are displayed in a terminal alongside a transcript of the conversation for users with permission to view the bookmarks. The bookmarks can function as reminds of important events in the conversation and can provide markers and the categorization regarding a particular matter that is raised in the conversation.

Referring to FIG. 7, in operation 701, processing logic receives an indication of a start of a conversation for a first user at a first terminal device. In operation 703, processing logic receives a connection request from the first user at a second terminal device (e.g., terminal device 115B). In operation 705, processing logic receives one or more requests to add one or more bookmarks to the conversation from first user at the second terminal device while the conversation for the first user is ongoing at the first terminal device (e.g., terminal device 115A), where the one or more bookmarks correlate to one or more conversation utterances within a timeline of the conversation. In operation 707, processing logic determines audio transcripts for the one or more voice utterances within the timeline of the conversation from the first terminal device. In operation 709, processing logic tags and stores, by the backend server, the one or more bookmarks with the conversation based on the timeline. Here, tagging refers to bundling the bookmarks and/or bookmark category with the conversation and storing the bundle in a single binary file, such as a protocol buffer file or any other file types.

In an embodiment, processing logic further generates and sends a conversation identifier of the conversation to the first user at the second terminal device. For example, the conversation identifier can uniquely identify a conversation that has started at the first terminal device and can identify if the conversation is ongoing.

In one embodiment, processing logic receives a bookmark category for each of the one or more bookmarks from the second terminal device, wherein the bookmark category is one of a plurality of bookmark categories. The category can be specified for the bookmark via a dropdown menu.

In one embodiment, the indication of the start of the conversation comprises a reference start time when the conversation has started.

In one embodiment, processing logic further receives a configuration setting from the first user indicating accessibility of bookmarks of the first user for each of one or more user groups, where the one or more user groups include at least: everyone, team members of the first user, manager of the first user, and a human resource user group.

In one embodiment, processing logic receives a request from a second user to access the audio transcripts of the conversation, determines whether the one or more bookmarks of the first user are accessible by the second user, and sends the audio transcripts and the one or more bookmarks to the second user in response to determining that the second user has access to the one or more bookmarks of the first user. For example, as owner of the bookmarks, the first user can set the permission for the bookmarks so only particular users/user groups can access the bookmarks.

In one embodiment, determining the one or more bookmarks are accessible by the second user includes determining at least one user group that has access to one or more bookmarks of the first user and determining that the second user belongs to the at least one user group.

In one embodiment, processing logic further receives a request from a second user to access the audio transcripts of the conversation, determines that the second user has no access to the one or more bookmarks of the first user, and sends the audio transcripts without the one or more bookmarks to the second user.

In one embodiment, the one or more bookmarks, the audio transcripts of the conversation, and a conversation identifier of the conversation are stored in a cache in a cloud environment.

Figure 8:
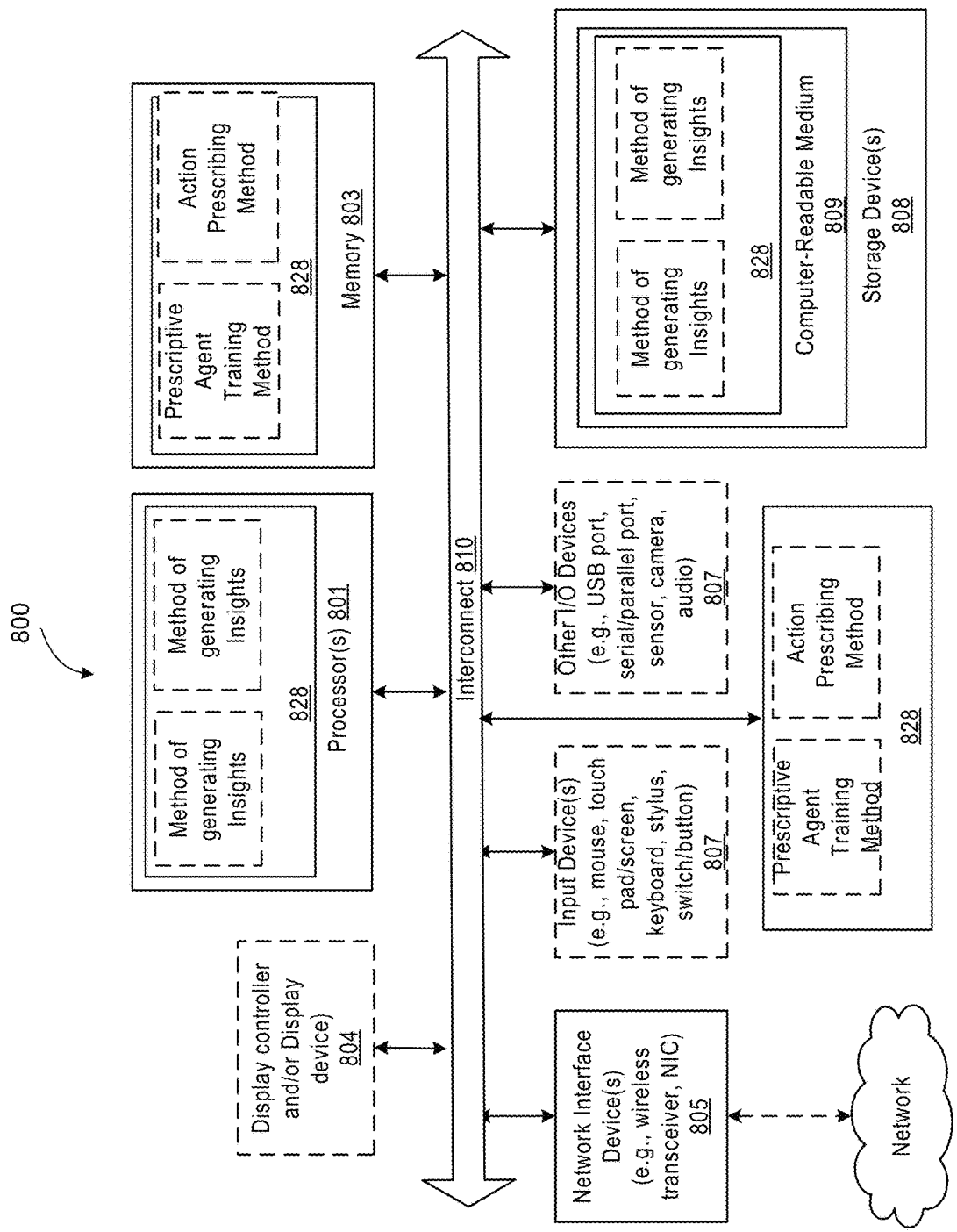
FIG. 8 is a block diagram illustrating an example of a data processing system which may be used with any embodiment.

FIG. 8 is a block diagram illustrating an example of a data processing system 800 which may be used with any embodiment of the disclosure. For example, system 800 may represent any of data processing systems described above, such as data analytics system 104, task database system 105, or activity database system 106, etc., performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

System 800 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

For one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 805-808, including network interface device(s) 805, optional input device(s) 807, and other optional IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 807 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However, for other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may also be coupled to processor 801, e.g., via a serial peripheral interface (SPI). This flash device may provide for non-volatile storage of system software, including a BIOS as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 may represent any of the components described above. Module/unit/logic 828 may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805.

Computer-readable storage medium 809 may also be used to store some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 828 can be implemented as firmware or functional circuitry within hardware devices. Further, module/unit/logic 828 can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of generating a bookmark for a voice conversation, comprising:
   receiving, at a backend server, an indication of a start of a call to a conversation for a first user at a first terminal device;
   receiving, at the backend server, a connection request from the first user at a second terminal device;
   receiving, by the backend server, one or more requests to add one or more bookmarks to the conversation from first user at the second terminal device while the conversation for the first user is ongoing at the first terminal device, wherein the one or more bookmarks correlate to one or more conversation utterances within a timeline of the conversation; and
   determining, by the backend server, audio transcripts for the one or more conversation utterances within the timeline of the conversation; and
   tagging and storing, by the backend server, the one or more bookmarks with the conversation based on the timeline.

2. The computer-implemented method of claim 1, further comprising: generating and sending, by the backend server, a conversation identifier of the conversation to the first user at the second terminal device.

3. The computer-implemented method of claim 1, further comprising: receiving, by the backend server, a bookmark category for each of the one or more bookmarks from the second terminal device, wherein the bookmark category is one of a plurality of bookmark categories.

4. The computer-implemented method of claim 1, wherein the indication of the start of the conversation comprises a reference start time when the conversation has started.

5. The computer-implemented method of claim 1, further comprising: receiving, by the backend server, a configuration setting from the first user indicating accessibility of bookmarks of the first user for each of one or more user groups, wherein the one or more user groups include at least: everyone, team members of the first user, manager of the first user, and a human resource user group.

6. The computer-implemented method of claim 5, further comprising:
   receiving, by the backend server, a request from a second user to access the audio transcripts of the conversation;
   determining whether the one or more bookmarks of the first user are accessible by the second user; and
   sending, by the backend server, the audio transcripts and the one or more bookmarks to the second user in response to determining that the second user has access to the one or more bookmarks of the first user.

7. The computer-implemented method of claim 6, wherein determining the one or more bookmarks are accessible by the second user comprises:
   determining at least one user group that has access to one or more bookmarks of the first user; and
   determining that the second user belongs to the at least one user group.

8. The computer-implemented method of claim 5, further comprising:
   receiving, by the backend server, a request from a second user to access the audio transcripts of the conversation;
   determining that the second user has no access to the one or more bookmarks of the first user; and
   sending, by the backend server, the audio transcripts without the one or more bookmarks to the second user.

9. The computer-implemented method of claim 1, wherein the one or more bookmarks, the audio transcripts of the conversation, and a conversation identifier of the conversation, are stored in a cache in a cloud environment.

10. A data processing system, comprising:
    a processor; and
    a memory coupled to the processor to store instructions, which when executed by the processor, cause the processor to perform operations, the operations comprising:
    receiving an indication of a start of a call to a conversation for a first user at a first terminal device;
    receiving a connection request from the first user at a second terminal device;
    receiving one or more requests to add one or more bookmarks to the conversation from first user at the second terminal device while the conversation for the first user is ongoing at the first terminal device, wherein the one or more bookmarks correlate to one or more conversation utterances within a timeline of the conversation; and determining audio transcripts for the one or more conversation utterances within the timeline of the conversation from the first terminal device; and tagging and storing the one or more bookmarks with the conversation based on the timeline.

11. The data processing system of claim 10, wherein the operations further comprise:

generating and sending a conversation identifier of the conversation to the first user at the second terminal device.

12. The data processing system of claim 10, wherein the operations further comprise:

receiving a bookmark category for each of the one or more bookmarks from the second terminal device, wherein the bookmark category is one of a plurality of bookmark categories.

13. The data processing system of claim 10, wherein the indication of the start of the conversation comprises a reference start time when the conversation has started.

14. The data processing system of claim 10, wherein the operations further comprise:

receiving a configuration setting from the first user indicating accessibility of bookmarks of the first user for each of one or more user groups, wherein the one or more user groups include at least: everyone, team members of the first user, manager of the first user, and a human resource user group.

15. The data processing system of claim 14, wherein the operations further comprise:

receiving a request from a second user to access the audio transcripts of the conversation;

determining whether the one or more bookmarks of the first user are accessible by the second user; and sending the audio transcripts and the one or more bookmarks to the second user in response to determining that the second user has access to the one or more bookmarks of the first user.

16. The data processing system of claim 15, wherein determining the one or more bookmarks are accessible by the second user comprises:

determining at least one user group that has access to one or more bookmarks of the first user; and determining that the second user belongs to the at least one user group.

17. The data processing system of claim 14, wherein the operations further comprise:

receiving a request from a second user to access the audio transcripts of the conversation;

determining that the second user has no access to the one or more bookmarks of the first user; and sending the audio transcripts without the one or more bookmarks to the second user.

18. The data processing system of claim 10, wherein the one or more bookmarks, the audio transcripts of the conversation, and a conversation identifier of the conversation are stored in a cache in a cloud environment.

19. A non-transitory computer-readable medium that stores instructions, which when executed by a data processing system comprising at least one hardware processor, cause the data processing system to perform operations comprising:

receiving, at a backend server, an indication of a start of a call to a conversation for a first user at a first terminal device;

receiving a connection request from the first user at a second terminal device;

receiving one or more requests to add one or more bookmarks to the conversation from first user at the second terminal device while the conversation for the first user is ongoing at the first terminal device, wherein the one or more bookmarks correlate to one or more conversation utterances within a timeline of the conversation; and determining audio transcripts for the one or more conversation utterances within the timeline of the conversation from the first terminal device; and tagging and storing the one or more bookmarks with the conversation based on the timeline.

20. The non-transitory computer-readable medium of claim 19, wherein the operations further comprise: generating and sending a conversation identifier of the conversation to the first user at the second terminal device.

* * * * *